United States Patent
Schoneman et al.

(10) Patent No.: US 7,899,415 B1
(45) Date of Patent: Mar. 1, 2011

(54) LOW-FREQUENCY POWER LINE EMISSIONS REDUCTION SYSTEM AND METHOD

(75) Inventors: George K. Schoneman, Cedar Rapids, IA (US); Debra S. Schoneman, legal representative, Cedar Rapids, IA (US); Bradley J. Dunford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 770 days.

(21) Appl. No.: 11/525,662

(22) Filed: Sep. 22, 2006

(51) Int. Cl.
 *H04B 1/04* (2006.01)
 *H01Q 11/12* (2006.01)

(52) U.S. Cl. ............... 455/114.2; 455/127.1; 455/127.5

(58) Field of Classification Search ............... None
See application file for complete search history.

(56) References Cited

U.S. PATENT DOCUMENTS

| | | | |
|---|---|---|---|
| 4,559,590 A | 12/1985 | Davidson | |
| 5,208,740 A | 5/1993 | Ehsani | |
| 5,563,498 A * | 10/1996 | Candy | 323/224 |
| 5,583,753 A * | 12/1996 | Takayama | 363/71 |
| 6,025,999 A | 2/2000 | Farrington et al. | |
| 6,031,749 A * | 2/2000 | Covington et al. | 363/98 |
| 6,078,612 A * | 6/2000 | Bertrand et al. | 375/219 |
| 6,081,434 A * | 6/2000 | Kinoshita et al. | 363/24 |
| 6,141,169 A * | 10/2000 | Pietruszynski et al. | 360/67 |
| 6,172,567 B1 * | 1/2001 | Ueno et al. | 330/285 |
| 6,275,397 B1 * | 8/2001 | McClain | 363/89 |
| 6,320,358 B2 * | 11/2001 | Miller | 323/222 |
| 6,344,985 B1 | 2/2002 | Akerson | |
| 6,414,866 B2 * | 7/2002 | Huggett et al. | 363/124 |
| 6,424,207 B1 * | 7/2002 | Johnson | 327/552 |
| 6,486,567 B2 | 11/2002 | Sano et al. | |
| 6,509,712 B1 * | 1/2003 | Landis | 320/101 |
| 6,624,533 B1 | 9/2003 | Swanson et al. | |
| 6,703,893 B1 | 3/2004 | Isham | |
| 6,898,092 B2 * | 5/2005 | Briere et al. | 363/39 |
| 6,915,112 B1 * | 7/2005 | Sutton et al. | 455/67.13 |
| 6,985,341 B2 * | 1/2006 | Vinciarelli et al. | 361/58 |
| 7,053,505 B2 * | 5/2006 | Tsuruya | 307/105 |

\* cited by examiner

*Primary Examiner*—Yuwen Pan
*Assistant Examiner*—Ayodeji Ayotunde
(74) *Attorney, Agent, or Firm*—Matthew J. Evans; Daniel M. Barbieri

(57) ABSTRACT

A radio system comprises a power source and a power amplifier circuit coupled to the power source on a power line. The radio system also comprises an active cancellation circuit. The active cancellation circuit comprises a bi-directional DC-DC converter. The active cancellation circuit is configured to cancel low-frequency emissions from the power amplifier circuit on the power line.

8 Claims, 5 Drawing Sheets

LOW-FREQUENCY POWER LINE EMISSIONS REDUCTION SYSTEM AND METHOD

BACKGROUND

The invention generally relates to systems and methods which may be applied to communications and other types of electronics systems. In particular the invention relates to systems and methods which provide for filtering of low frequency emissions onto the prime power line for the communications equipment.

Various conventional electronic systems with significant load modulation, such as RF power amplifier applications, may result in significant low-frequency current emissions that are conducted back out on the power line. For example, modulation waveforms such as AM voice, ASK AM, Have. Quick IIA, and the like, all may exhibit such emissions. Electromagnetic Interference/Electromagnetic Compatibility (EMI/EMC) standards such as MIL-STD-461 CE101, limit the conducted emissions that an equipment may generate at the power input interface. Meeting these requirements for low frequency emissions, such as for AM voice, requires filters (including large capacitors and inductors) with low cutoff frequencies and correspondingly large volume and weight, both of which may be particularly undesirable in both airborne and mobile applications.

Accordingly, there is a need for a system and method of reducing power line emissions in RF applications which provide both weight and volume savings over conventional solutions. There is also a need for a system and method which reduces power line emissions in RF applications by utilization of one or more capacitors which are substantially smaller than those used in conventional solutions.

The techniques herein below extend to those embodiments which fall within the scope of the appended claims, regardless of whether they accomplish one or more of the above-mentioned needs.

SUMMARY

What is provided is a radio system. The radio system comprises a power source and a power amplifier circuit coupled to the power source on a power line. The radio system also comprises an active cancellation circuit. The active cancellation circuit comprises a bi-directional DC-DC converter. The active cancellation circuit is configured to cancel low-frequency emissions from the power amplifier circuit on the power line.

What is also provided is a method of generating a radio signal. The method comprises providing power from a power source on a power line and amplifying an output signal using a power amplifier circuit coupled to the power source on the power line. The power amplifier produces low frequency emissions on the power line. The method also comprises canceling substantially the low-frequency emissions using an active cancellation circuit. The active cancellation circuit comprises a bi-directional DC-DC converter.

Further, what is provided is a device for generating a radio signal. The device comprises a means for providing power from a power source on a power line and a means for amplifying an output signal using a power amplifier circuit coupled to the power source on the power line, the power amplifier producing low frequency emissions on the power line. The device also comprises a means for canceling substantially the low-frequency emissions using an active cancellation circuit. The active cancellation circuit comprises a bi-directional DC-DC converter.

Further still, what is provided is a radio system. The radio system comprises a power source. The radio system also comprises a power amplifier circuit coupled to the power source on a power line. The radio system further comprises an active cancellation circuit, the active cancellation circuit comprising two DC-DC converters operating in parallel, one capable of charging an energy storage capacitor and the other capable of discharging the energy storage capacitor, the active cancellation circuit configured to cancel low-frequency emissions from the power amplifier circuit on the power line.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
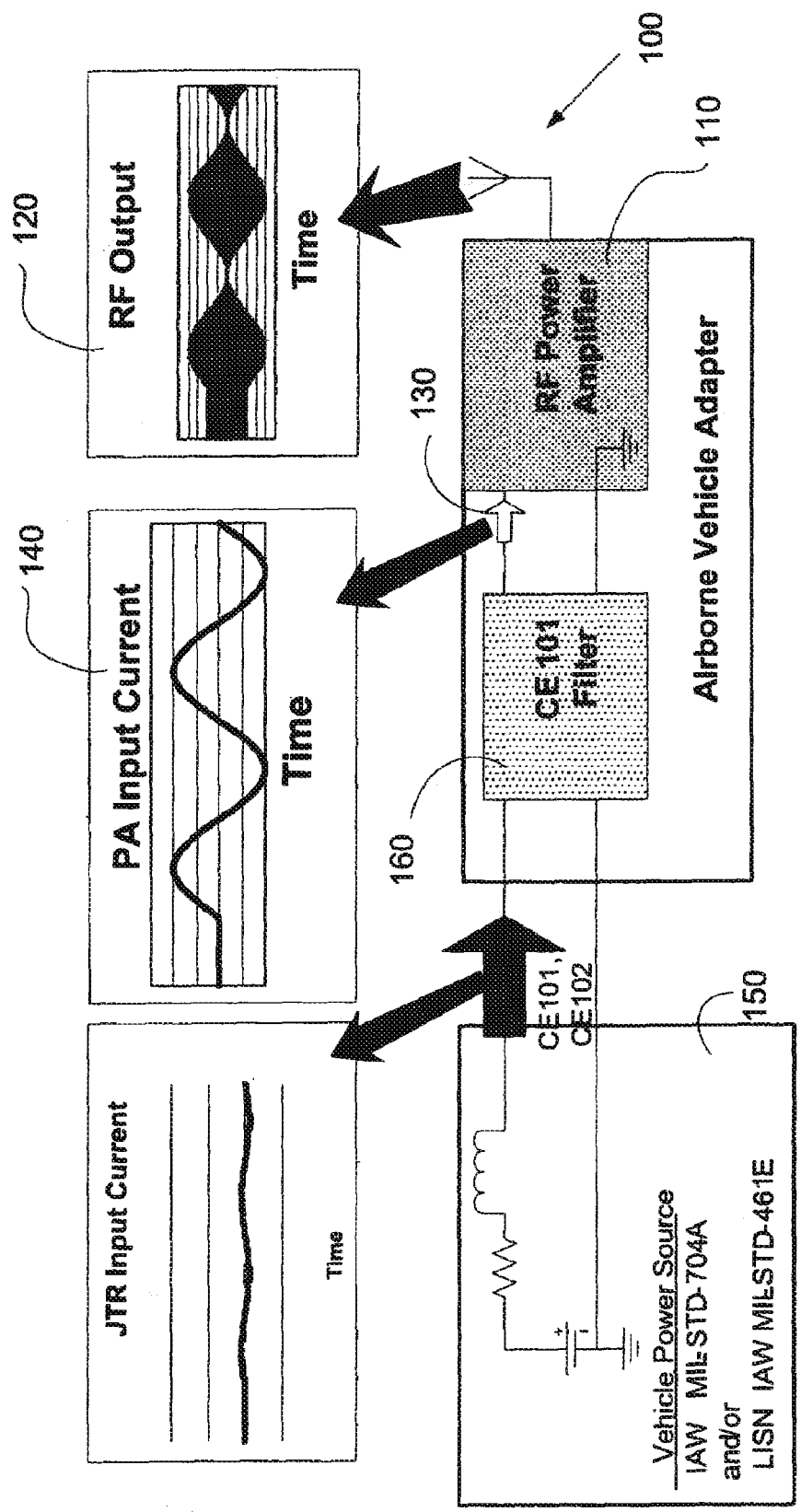
FIG. 1 is an exemplary block diagram of a conventional radio amplifier used in a radio in an airborne vehicle adapter.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In a variety of RF communication devices and other electronic systems, RF Power Amplifiers (and possibly other electronic elements) transfer waveform amplitude characteristics of the RF signal onto the prime power line. Depicted in FIG. 1 is a system 100 in accordance with the prior art which shows that the RF Power amplifier 110 generates RF output 120. The Amplifier is powered by an input current 130 having an amplitude as depicted in graph 140. If not properly dealt with, RF power amplifier 110 may transfer characteristics of the RF signal 120 onto the prime power line coming from power source 150, including low frequency characteristics. Because of the transfer of waveform characteristics onto the prime power line, large filters 160 isolate the power amplifier from the power line. In airborne and other mobile applications such large filters may be undesirable because they occupy a large volume and may have significant weight.

Many and varied waveforms result in low-frequency conducted emissions. Some of these waveforms, but not limited to these waveforms, are as follows:

- AM voice which is sinusoidal from 300 Hz to 3,000 Hz.
- AM secure voice (baseband) which is 16 kbps data with an amplitude response within 3 dB from 10 Hz to 10,240 Hz.
- AM secure voice (diphase) which is 16 kbps data with an amplitude response within 3 dB from 300 Hz to 21,300 Hz.
- SINCGARS which is a frequency hopping waveform with a hopping rate within the frequencies of interest.
- SATURN which is a frequency hopping waveform with a hopping rate within the frequencies of interest.
- Have Quick has characteristics that have both AM voice and frequency hopping that impact the frequency range of interest.
- WNW has a TDMA structure that impacts the frequency range of interest.

Other modulation and waveform characteristics may also be required and may further or additionally impact prime power performance in the frequency range of interest.

Figure 2:
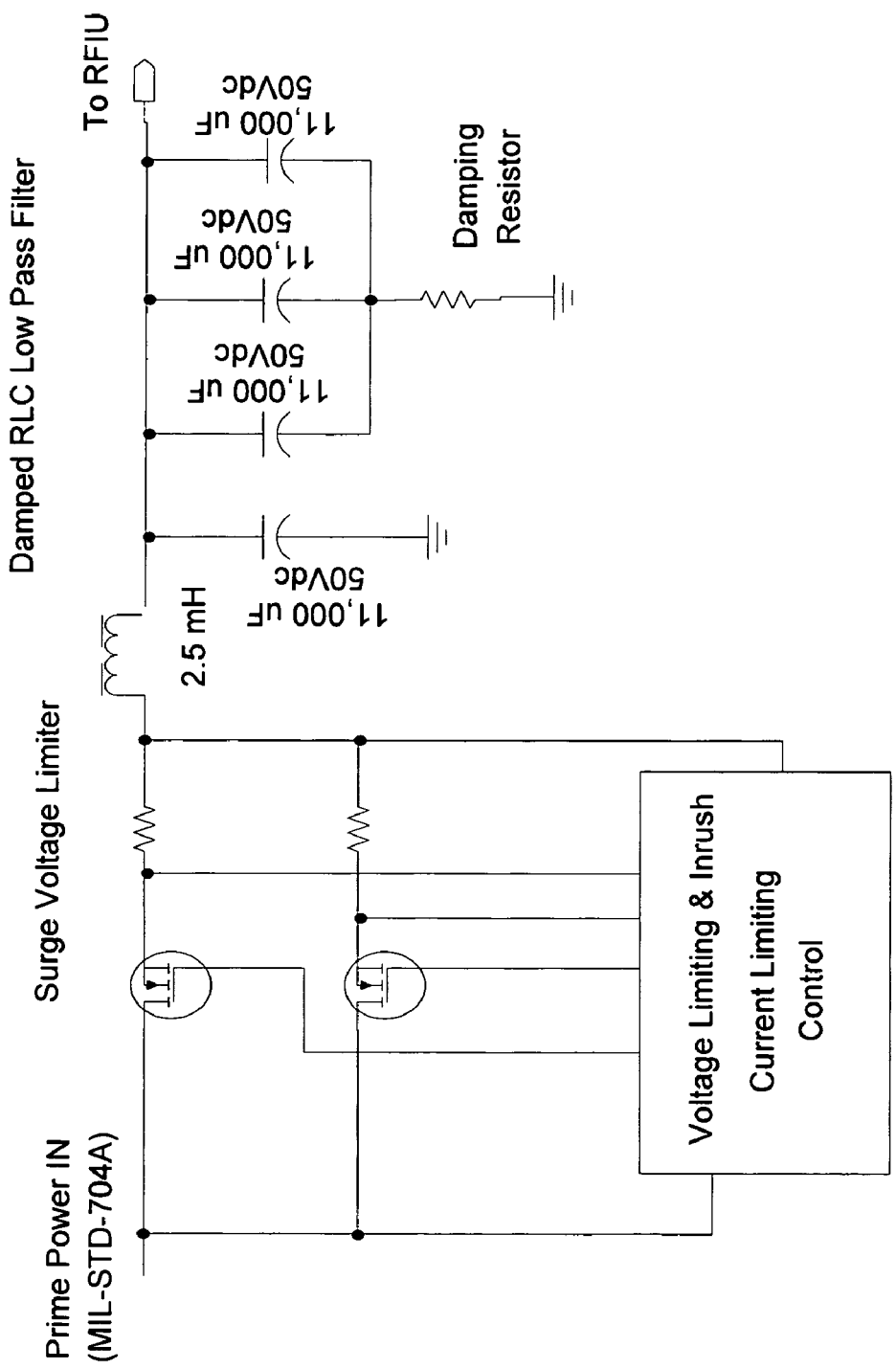
FIG. 2 is an exemplary schematic diagram of a conventional filtering circuit.

Previous attempts have been made to provide low-frequency filtering. Such attempts included, but are not limited to Brute Force Low-Pass Filtering. A filter of this type is schematically depicted in FIG. 2. An example of this type of conventional filter includes large capacitor and inductor elements, and may be heavy due to the heavy iron and copper (inductor core and windings), on the order of pounds, not ounces. Such filters, may have cutoff frequencies approximately 30 Hz or less.

Figure 3:
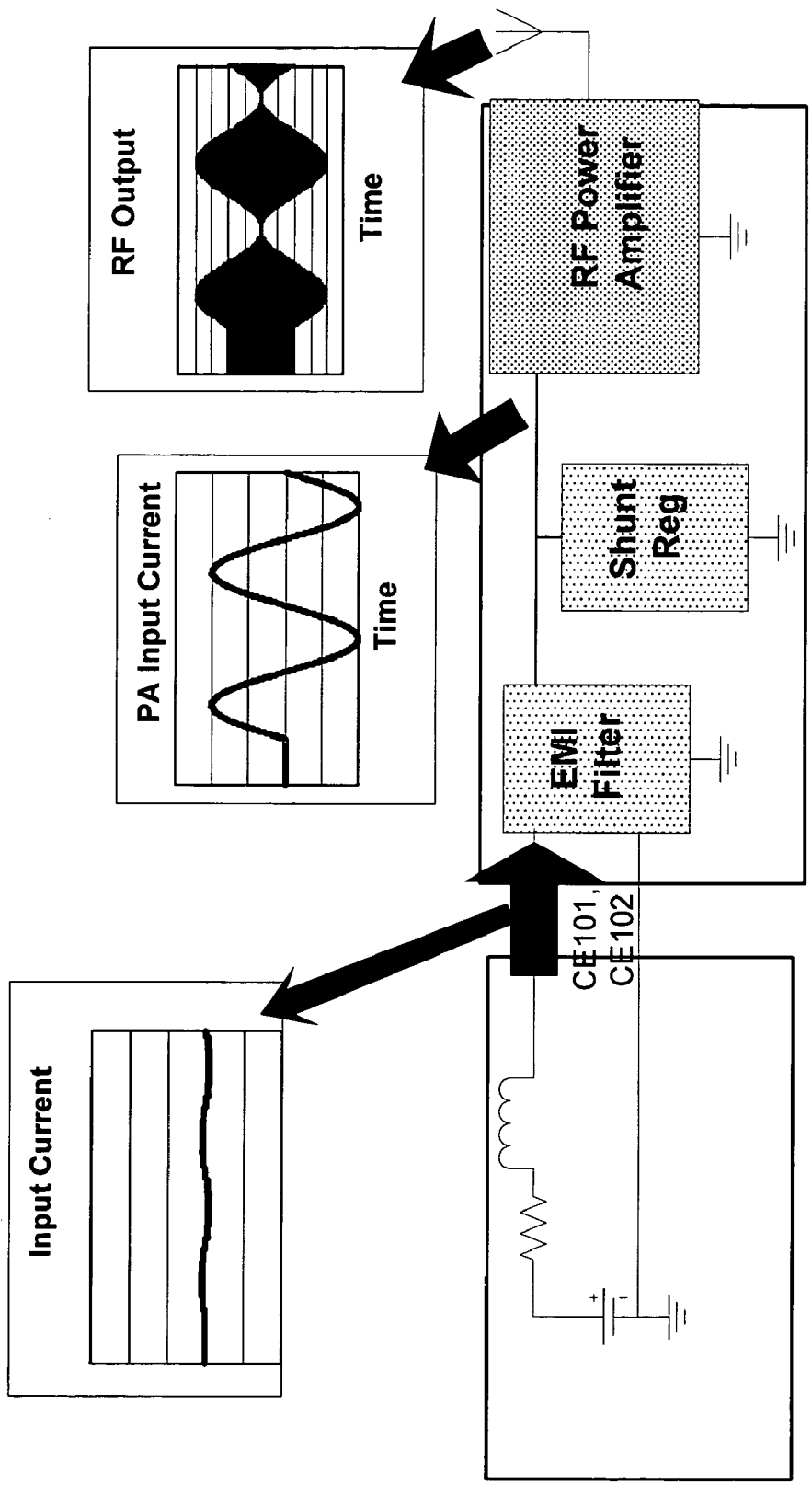
FIG. 3 is an exemplary block diagram of a radio system in which a shunt regulator is applied for filtering.

Another conventional solution to the low-frequency filtering problem is the use of a shunt regulator as depicted in FIG. 3. In the exemplary block diagram depicted, the shunt regulator is used to dissipate the difference between the power amplifier current and the peak line current. The resultant filtering is accomplished however, the shunt regulator solution is dissipative in nature and is therefore not practical for power amplifiers of 10 to 20 Watts or more. Such a solution causes a major reduction in system efficiency and large heat sinks are needed to handle the power dissipation. Accordingly, the shunt regulator solution is also not desirable for the airborne and mobile applications (among others) as discussed above.

Figure 4:
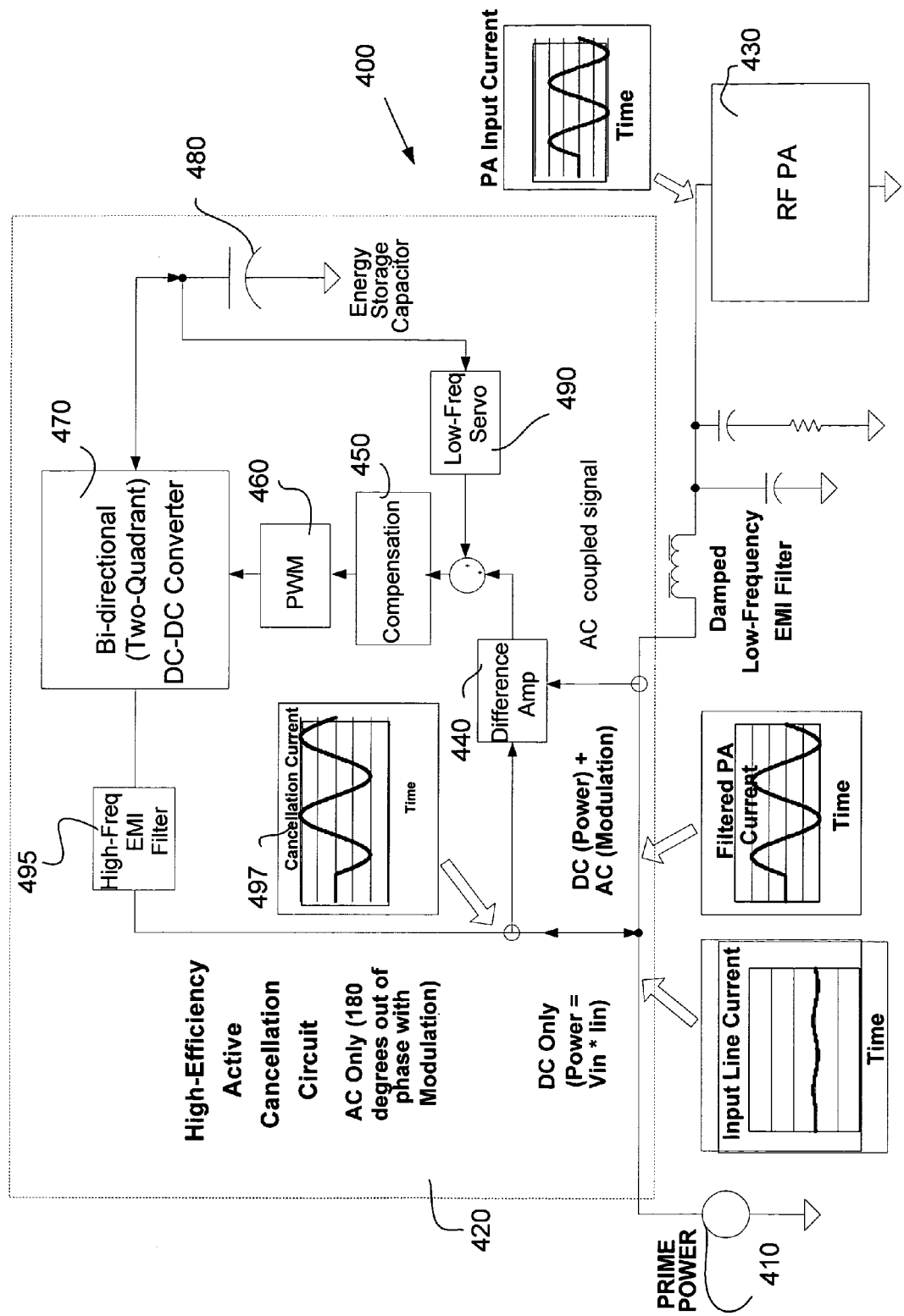
FIG. 4 is an exemplary block diagram of a radio frequency power amplifier system including an active cancellation circuit.

Referring now to FIG. 4, an exemplary embodiment of a low-frequency emissions reduction system 400 is depicted. A prime power source 410 is coupled to a high-efficiency active cancellation circuit 420. High-efficiency active cancellation circuit 420 allows power to be provided to RF power amplifier (PA) 430 while actively canceling low-frequency emissions due to the waveform being implemented, which may otherwise be carried back to the prime power source 410.

High-efficiency active cancellation circuit 420 comprises a differential amplifier 440 which looks at the difference between the current needing to be filtered and the cancellation current to develop an error signal. The error signal is provided to a compensation circuit 450 which is a control to control pulse width modulation (PWM) circuit 460. Compensation circuit 450 desirably has a settable or preset gain. The controlled PWM signal is provided to a bi-directional (two-quadrant) DC-DC converter 470 which has capabilities to source and sink the current in connection with energy storage capacitor 480. A low-frequency servo 490 controls the average voltage across capacitor 480. Servo 490 provides a set point to keep the average voltage across the energy storage capacitor at a fixed value, such that the capacitor maximum voltage rating is not exceeded when maximum energy is returned to the capacitor 480. The average voltage set point, should as a general point, be as high as practical (within the storage capacitor 480 voltage rating constraint) to maximize energy storage capability and, therefore, current cancellation capability. Bi-directional DC-DC converter 470 provides a cancellation current, which is high frequency filtered by high-freq EMI filter 495 to provide the resultant cancellation current 497. An alternative instantiation would utilize two DC-DC converters operating in parallel; one capable of charging the energy storage capacitor and the other capable of discharging the energy storage capacitor, thereby, performing the same function as a two quadrant bi-directional DC-DC converter.

The bi-directional (two-quadrant—source and sink current) DC-DC converter 470 provides cancellation by charging energy storage capacitor 480. System 400 therefore is able to take advantage of the fact that energy storage (Joules) is proportional to $V^2$ ($E=0.5°\ C.*V^2$). This fact enables better utilization of the energy storage capability of the capacitor. Further, by using a higher energy storage voltage, capacitor volume may be minimized. In the exemplary embodiment shown, the closed loop control of the cancellation circuit may provide approximately 38 db at 30 Hz (more as modulation increases). Also, it may be possible to design the system for other levels of attenuation without departing from the scope of the claims. The cancellation characteristics are limited by loop stability, i.e. the system may have stability limits in view of the complex control loop response with large phase shifts that is inherent to a system of this type. A further advantage of the system of FIG. 4 is the use of low-frequency servo amplifier 490 which "centers" the energy storage capacitor voltage for maximum usable dynamic range. In order to accomplish the proper cancellation response, it is desirable to have much slower response in the servo amplifier loop than the lowest modulation frequency to be cancelled to prevent "fighting" the current cancellation control loop.

Figure 5:
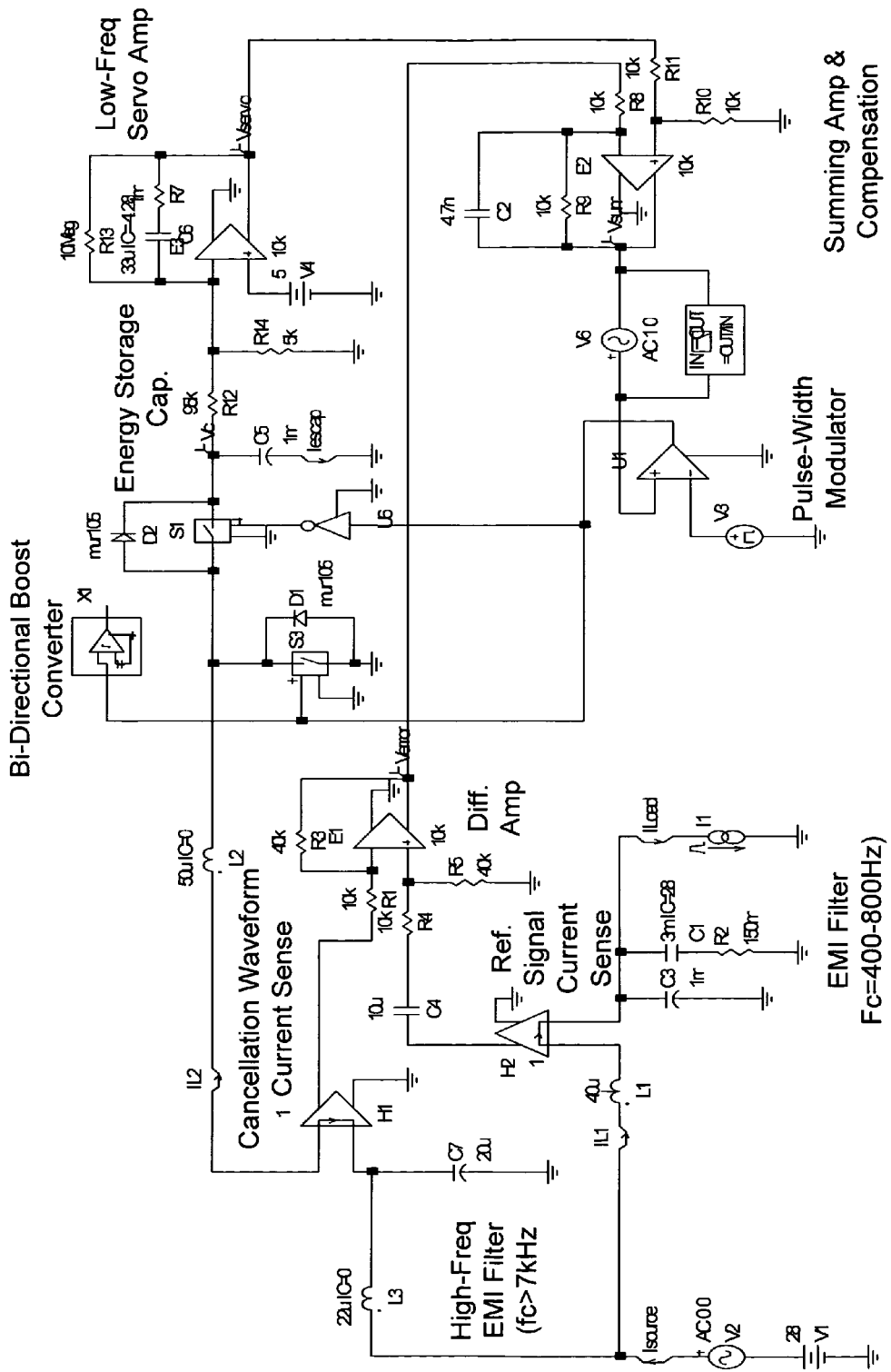
FIG. 5 is a schematic diagram of an exemplary embodiment of the active cancellation circuit of FIG. 4.

In accordance with an exemplary embodiment, a schematic diagram of an active cancellation circuit is depicted in FIG. 5. Although FIG. 5 depicts one particular implementation of the cancellation circuit, other circuits may also be implemented, without departing from the scope of the claims.

In an exemplary embodiment the cancellation circuit described above may be implemented in a military radio system such as the Joint Tactical Radio System (JTRS) (for 300 Hz modulation). Weight and volume reductions may be seen in the following table:

| Component | Baseline Passive Design (300 Hz - 10 kHz) | | Active Cancellation Design (30 Hz - 10 kHz) | |
|---|---|---|---|---|
| | Weight (lbs) | Size (in$^3$) | Weight (lbs) | Size (in$^3$) |
| LF Inductor | 4.5 | 36 | 0.27 | 2 |
| Filter Capacitors | 0.8 | 12 | 0.3 | 4.5 |
| Damping Resistors | 0.1 | 2 | 0.1 | 2 |
| Surge Limiter | 0.5 | 6 | | |
| HF Power Inductor | | | 0.1 | 1 |
| Energy Storage Capacitor | | | 0.1 | 1.5 |
| HF EMI Filter | | | 0.1 | 1.5 |
| Power Circuit & Control | | | 0.1 | 2 |
| Total | 5.9 | 56 | 1.07 | 14.5 |

A Weight reduction factor of 5× (from 5.9 lbs to 1.1 lbs), 4.8 lb reduction per terminal, 9.6 lb per shipset (not including reductions in mechanical housings, mounting brackets, etc.) can be seen in the table. Also, a size reduction factor of 4× (from 56 in$^3$ to 14.5 in$^3$) can be seen. Further, because the baseline passive filter design was not acceptable from a weight standpoint, an alternative solution, such as but not limited to the active cancellation design described, is necessitated.

The active cancellation approach described may be applied to virtually any type of low-frequency modulation. Because of the active cancellation and associated control, the filter does not need to be redesigned for each new modulation type (for comparable power levels). Because the amount of modulation reflected to the power line is not always easy to analyze/predict, conventionally filters needed to be designed for each new system or system modification. However, less analysis is required to assure compliance with standards, certifications, and requirements because the solution provided above includes active cancellation in which the cancellation current is controlled in a stable environment. Thus, it may be possible and desirable to add the cancellation circuit as a module that is external to a given piece of equipment.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio system comprising:
   a power source;
   a power amplifier circuit coupled to the power source on a power line; and
   an active cancellation circuit, the active cancellation circuit coupled to the power source and said power amplifier circuit, the active cancellation circuit comprising:
      a bi-directional DC-DC converter;
      a high-frequency EMI filter, the high-frequency EMI filter coupled to said bi-directional DC-DC converter;
      a storage capacitor, the storage capacitor coupled with said bi-directional DC-DC converter, the bi-directional DC-DC converter is configured to sink and source current from the storage capacitor;
      a servo amplifier, the servo amplifier coupled to said storage capacitor and configured to control an average voltage across the storage capacitor;
      a pulse width modulator circuit, the pulse width modulator circuit is coupled to said bi-directional DC-DC converter and provides a control signal to said DC-DC converter to sink or source current from the storage capacitor;
      a compensation circuit, the compensation circuit provides an error signal to said pulse width modulator circuit, the pulse width modulator circuit translates said error signal to said control signal; and
      a differential amplifier communicatively coupled to the high-frequency EMI filter, the compensation circuit, and the power source, wherein the differential amplifier provides the error signal to the compensation circuit, wherein the differential amplifier creates the error signal by determining a difference between a resultant cancellation current provided by the high-frequency EMI filter and a current provided via the power amplifier circuit, the active cancellation circuit is configured to cancel low-frequency emissions from the power amplifier circuit on the power line based upon the error signal.

2. The radio system of claim 1, wherein the bi-directional DC-DC converter comprises a two-quadrant bi-directional DC-DC converter.

3. The radio system of claim 1, wherein the power source comprises a DC power source.

4. The radio system of claim 1, wherein the radio system is configured for airborne applications.

5. A method of generating a radio signal, comprising:
   providing power from a power source on a power line;
   amplifying an output signal using a power amplifier circuit coupled to the power source on the power line, the power amplifier producing low-frequency emissions on the power line; and
   canceling substantially the low-frequency emissions based upon an error signal using an active cancellation circuit, the active cancellation circuit comprising:
      a bi-directional DC-DC converter;
      a high-frequency EMI filter, the high-frequency EMI filter coupled to said bi-directional DC-DC converter;
      a storage capacitor, the storage capacitor coupled with said bi-directional DC-DC converter, the bi-directional DC-DC converter is configured to sink and source current from the storage capacitor;
      a servo amplifier, the servo amplifier coupled to said storage capacitor and configured to control an average voltage across the storage capacitor;
      a pulse width modulator circuit, the pulse width modulator circuit is coupled to said bi-directional DC-DC converter and provides a control signal to said DC-DC converter to sink or source current from the storage capacitor;
      a compensation circuit, the compensation circuit provides an error signal to said pulse width modulator circuit, the pulse width modulator circuit translates said error signal to said control signal; and
      a differential amplifier communicatively coupled to the high-frequency EMI filter, the compensation circuit, and the power source, wherein the differential amplifier provides the error signal to the compensation circuit, the differential amplifier creates the error signal by determining a difference between a resultant cancellation current provided by the high-frequency EMI filter and a current provided via the power amplifier circuit.

6. The method of claim 5, wherein the bi-directional DC-DC converter comprises a two-quadrant bi-directional DC-DC converter.

7. The method of claim 5, wherein the power source comprises a DC power source.

8. A radio system comprising:

a power source;

a power amplifier circuit coupled to the power source on a power line; and an active cancellation circuit, the active cancellation circuit coupled to the power source and said power amplifier circuit, the active cancellation circuit comprising:

a first DC-DC converter and a second DC-DC converter configured to operate in parallel;

a high-frequency EMI filter, the high-frequency EMI filter coupled to said first DC-DC converter and said second DC-DC converter;

a storage capacitor, the storage capacitor coupled to said first DC-DC converter and said second DC-DC converter, the first DC-DC converter configured to charge the storage capacitor and the second DC-DC converter configured to discharge the storage capacitor;

a servo amplifier, the servo amplifier coupled to said storage capacitor and configured to control an average voltage across the storage capacitor;

a pulse width modulator circuit, the pulse width modulator circuit is coupled to said to said first DC-DC converter and said second DC-DC converter and provides a control signal to said first DC-DC converter and said second DC-DC converter to sink or source current from the storage capacitor;

a compensation circuit, the compensation circuit provides an error signal to said pulse width modulator circuit, the pulse width modulator circuit translates said error signal to said control signal; and a differential amplifier communicatively coupled to the high-frequency EMI filter, the compensation circuit, and the power source, wherein the differential amplifier provides the error signal to the compensation circuit, the differential amplifier creates the error signal by determining a difference between a resultant cancellation current provided by the high-frequency EMI filter and a current provided via the power amplifier circuit, the active cancellation circuit is configured to cancel low-frequency emissions from the power amplifier circuit on the power line based upon the error signal.

* * * * *